March 25, 1941.   J. R. NOLAN   2,235,899
MACHINE FOR BOOKING MATCHES
Filed April 30, 1940   5 Sheets-Sheet 1

Inventor:
John R. Nolan

March 25, 1941.   J. R. NOLAN   2,235,899
MACHINE FOR BOOKING MATCHES
Filed April 30, 1940   5 Sheets-Sheet 2

Inventor.
John R. Nolan

March 25, 1941.                J. R. NOLAN                2,235,899
                        MACHINE FOR BOOKING MATCHES
                        Filed April 30, 1940          5 Sheets-Sheet 3

Inventor.
John R. Nolan

March 25, 1941.  J. R. NOLAN  2,235,899

MACHINE FOR BOOKING MATCHES

Filed April 30, 1940   5 Sheets-Sheet 4

Inventor
John R. Nolan

Patented Mar. 25, 1941

2,235,899

UNITED STATES PATENT OFFICE 2,235,899

MACHINE FOR BOOKING MATCHES

John R. Nolan, Larchmont, N. Y., assignor to The Diamond Match Company, New York, N. Y., a corporation of Delaware Application April 30, 1940, Serial No. 332,426

9 Claims. (Cl. 93—2)

This invention relates to a machine for booking matches, and more particularly to a machine of the type disclosed in Letters Patent of the United States No. 1,042,472, dated October 29, 1912. The machine forming the subject of the patent mentioned comprises a carrier consisting of an endless chain of pocketed links (each embodying a resilient clamping member) constructed and arranged for intermittent movement along an extended path in which are included in succeeding order mechanism whereby flat covers for match books are folded at one end and inserted in the adjacent links of the carrier in such manner that the folds project rearwardly of, and the bodies of the covers are clamped in, the links; mechanism whereby conventional match cards are pushed flatwise into the respective links with the bases of the cards within the end folds of the covers, the match cards thus being yieldingly clamped against the bodies of the respective covers; mechanism whereby the associated cards and covers are stitched or otherwise fastened together while they are borne by the carrier, and mechanism whereby friction paint material is applied to the exterior of the respective covers during their travel, all as will more fully appear by reference to said patent. In the absence of cards of matches from a carrier link or links when the latter leave the card inserting station, the empty covers progress to the stitching, painting and other mechanisms included in the book making cycle, thus requiring the manual removal of the empty covers, and sometimes the temporary stopping of the machine.

The object of my invention is to provide mechanism of simple and efficient construction and operation whereby the covers from which the match cards have been omitted, are rapidly extracted from the carrier, and this without interference with the properly associated covers and cards in the carrier, which mechanism is conveniently located in proximity to the card inserting station.

With this object in view my invention comprises novel features of construction and combinations of parts which in exemplifying forms of embodiment of my invention will be hereinafter described; the scope of the invention being expressed in the appended claims.

In the drawings—

Figure 8:
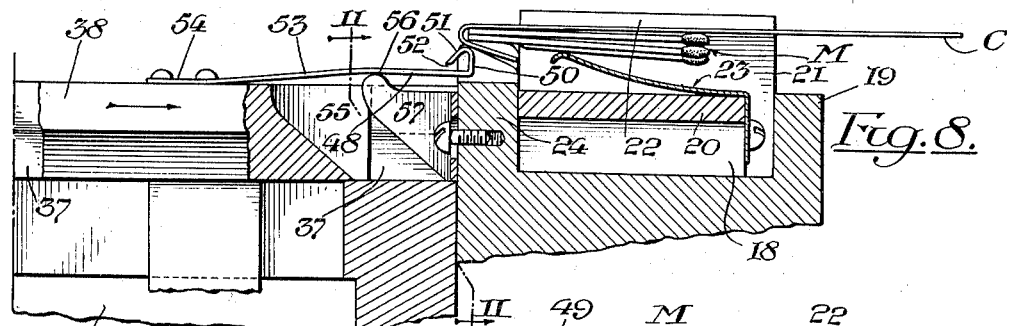
Fig. 8 is a section similar to Fig. 5, but showing the carrier supplied with a cover and associated match cards.
Figure 9:
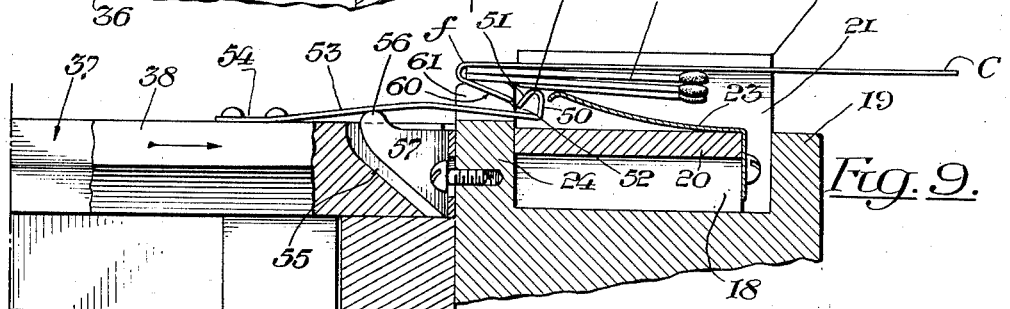
Figs. 9 and 10 are similar sections showing the head and its cover-extracting member in successive positions in relation to the carrier and the cover and match cards.
Figure 10:
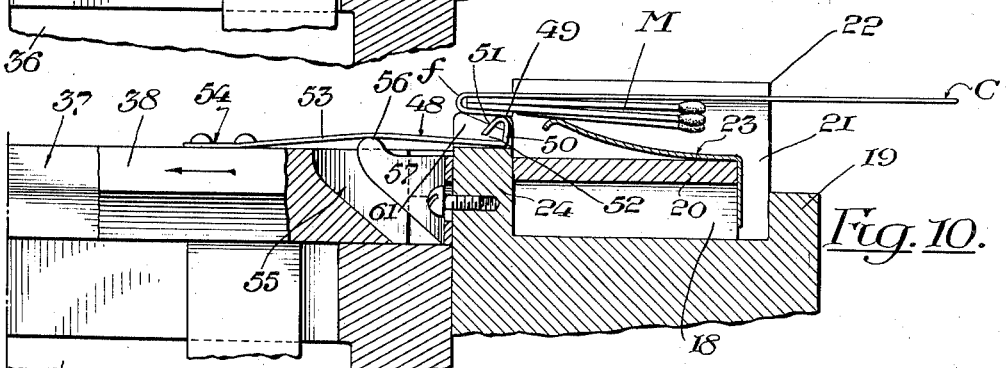
Figure 11:
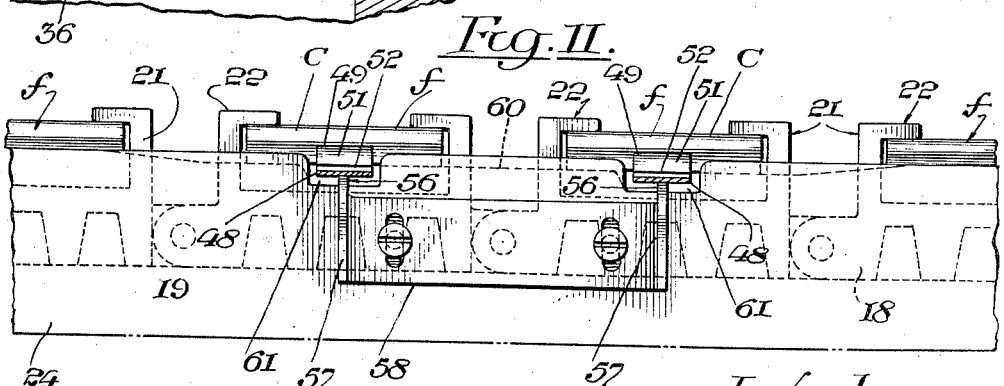
Fig. 11 is a longitudinal vertical section in a plane adjacent the rear of the carrier trough of the table, as on the line 11—11 of Fig. 8, the cam device for controlling the cover-extracting member being in elevation.
Figure 12:
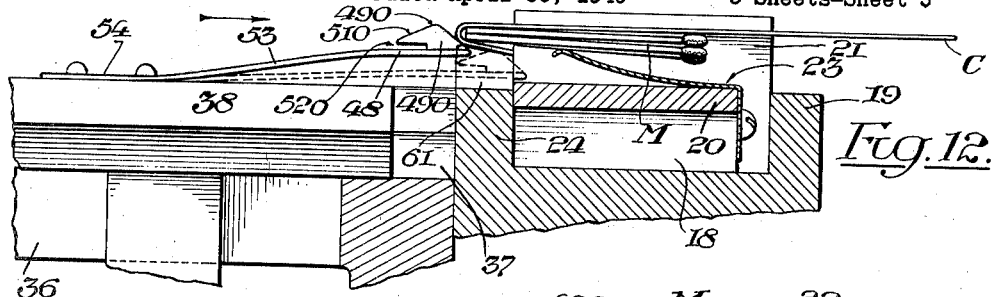
Figure 13:
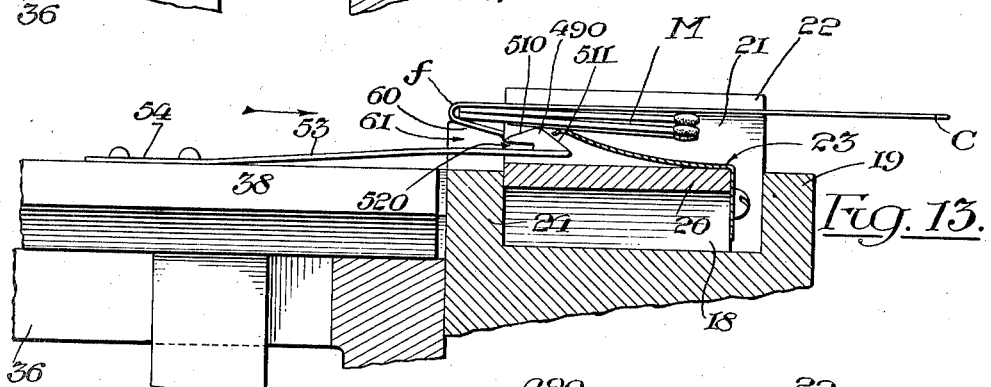
Figure 14:
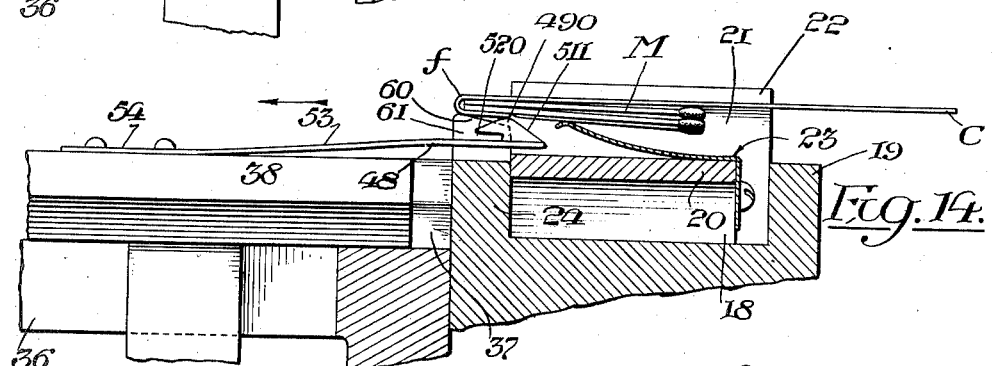

Figs. 12 to 14, inclusive, are transverse sections similar to Figs. 8, 9 and 10, respectively, but showing a modified form of cover-extracting member.

Figure 6:
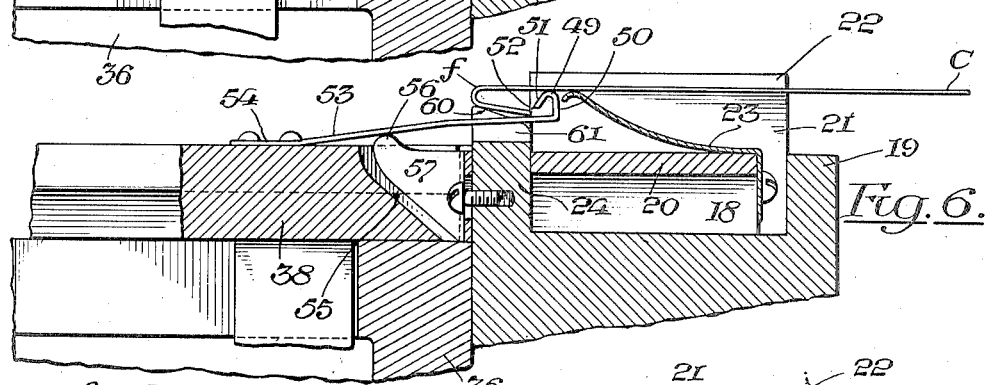
Figure 15:
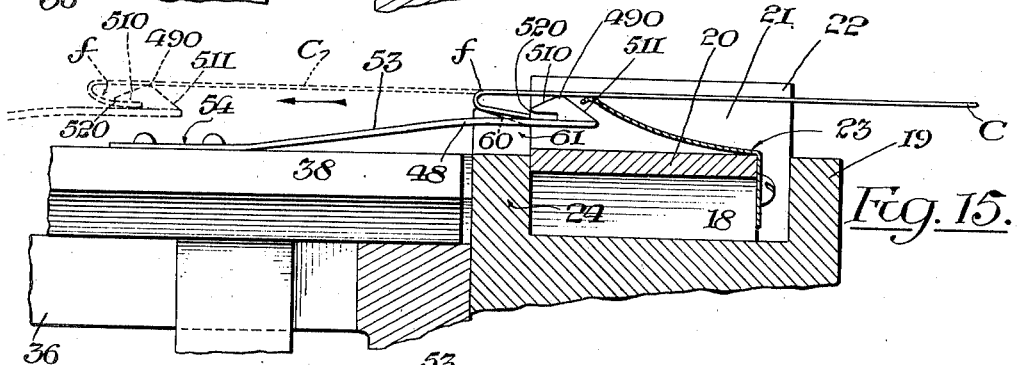

Fig. 15 is a section similar to Fig. 6, but showing the modified form of cover-extracting means.

Figure 16:
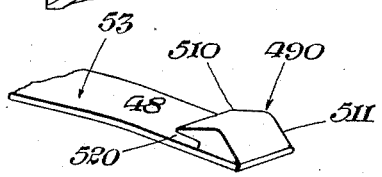

Fig. 16 is a fragmentary view of the modified cover-extracting member.

Referring to the drawings, 15 designates a part of the supporting frame including the table 16 of a typical match booking machine; 17 the main cam shaft which extends longitudinally of the frame and beneath the table, and 18 a portion of a carrier which is intermittently actuated by and from the cam shaft through suitable gearing. The carrier comprises an endless chain of pocketed links adapted to travel in a longitudinally extending channel or guide trough 19 at the rear of the table, each link including a base 20 with parallel side walls 21 having inwardly overhanging flanges 22, and embodying also a spring clamping leaf 23 which is secured at one end to the base and inclined upwardly and rearwardly so that the free upper end of the leaf co-acts with the under surfaces of the flanges.

During each dwell of the carrier in its intermittent travel two covers C, each folded at one end, are inserted in the adjacent carrier links, with the folded ends *f* projecting rearwardly beyond the respective links while the bodies of the covers are yieldingly clamped against the flanges 22 by the spring leaves 23. The projecting hinged folds, which are relatively stiff, bear yieldingly upon and are supported by the rearward wall 24 of the trough. In the continued travel of the carrier the thus end folded covers are presented to mechanism including a reciprocating pusher indicated at 25, whereby match cards M are inserted in the links which were previously located at the cover-inserting mechanism. The cards are pushed between the spring leaves and the under surfaces of the respective covers so that the uncut bases of the cards are within the confines of the folded ends of their complementary covers. Usually two counterpart cards of matches, one card superposed on the other, are inserted in each link.

The card pusher 25 of the booking machine is flexibly connected to a rocker arm 26 rising from a sleeve 27 loose on a suitably-disposed shaft 28. On this sleeve is a depending arm 29 which is pivotally connected by means of a link 30 with an upstanding arm 31 pivotally supported in a bracket 32 on the bed of the booking machine. The arm 31 has a lateral roll 33 which is operatively fitted in the cam race 34 of a cam 35 on the shaft 17; the contour of the cam race being such that the arm 31 is oscillated at determined intervals so as to transmit reciprocating motion through the lever arms 29 and 26 to the pusher 25 in timed relation to the carrier; that is to say, during each succeeding dwell of the carrier. The cover and card inserting mechanisms are or may be similar to those described in Patent No. 1,042,472.

In the continued progress of the carrier 18 the assembled book elements clamped therein are transported to stitching mechanism; thence (if not "pre-frictioned") to friction paint-applying mechanism; thence to the succeeding stations in the book making cycle, as usual.

Mechanism embodying the principle of my invention for extracting unfilled match book covers from the carrier links is mounted adjacent the path of the carrier, preferably immediately following the card-inserting station. In the case of a booking machine in which, as herein illustrated, provision is had for the insertion of match cards in plural links during each dwell of the carrier, the mechanism includes a reciprocating cover-extracting device movable in timed relation to the carrier and so controlled by the absence and presence of match cards in the covers as to engage and escape, respectively, the rearwardly projecting end folds of the covers in the plural links, as will now be described.

Fixed to the rear of the table 16, adjacent the carrier, is a bracket 36 having rearwardly projecting guide members 37 in and between which is slidably mounted a reciprocative head 38. This head is pivotally connected by means of a link 39 with the upper end of a rocker arm 40 which in turn is loosely mounted on a shaft 41 supported by a bracket 42 on the bed of the booking machine. The hub 43 of the rocker-arm has a shorter upstanding arm 44 which is pivotally connected by means of a link 45 with a short depending arm 46 on a hub 47 which is loosely mounted on the shaft 28 and in close relation to the sleeve 27 of the rocker-arms 26 and 29 of the usual card inserting mechanism of the booking machine. The hub 47 is keyed or otherwise fixed to the sleeve 27 so as to constitute, in effect, an integral part of the latter. Therefore during the operation of the card inserting mechanism the arm 46 is actuated to effect through the link and arm connections just mentioned the reciprocation of the head 38 in timed relation to the card pusher 25 and the carrier 18; that is to say, during each dwell of the carrier the pusher 25 and the head 38 simultaneously move toward the respective links in line therewith and then recede from the links. Any other suitable means for actuating the head may be employed.

Supported on the head 38 and at right angles to the path of the carrier, are two strips of resilient material which are arranged in spaced parallel relation to provide forwardly extending blades 48 terminating in hook projections 49 which during the reciprocation of the head are moved into and from the path of the opposing folded end portions, *f*, of each succeeding pair of covers advanced by the links of the carrier.

Each of the hooks is formed by bending up the free end of the strip, preferably at right angles, or substantially so, as at 50, and then curving it rearwardly and downwardly toward, but short of the body of the strip to provide an inclined cam surface 51, below which is a narrow entrant space 52 for the free edge of the fold of the cover material. The forwardly projecting portion of each blade lies in a horizontal plane or substantially so, and then merges with a portion 53 which inclines downwardly and rearwardly to the upper surface of the head and terminates in a horizontal base portion 54 fastened to the head. If desired the blades may be formed from a single bifurcated sheet of suitable material.

The inclined portion 53 of the respective blades overlie parallel slots 55 in the forward portion of the head 38, which slots afford clearance for a pair of suitably located stationary cam members 56 as the head approaches the limit of its stroke toward the carrier. These cam members are conveniently formed by the rounded upper projections of the rearwardly bent end portions 57 of a metal strip 58 which is secured to the rear wall 24 of the trough. The top of this wall, in the region of each succeeding pair of covers with the end folds of which the hooks 49 are designed to engage, is downwardly and forwardly inclined in cross-section, as at 60, so that by their inherent elasticity the folds, with or without match cards associated therewith, occupy a similarly inclined or partially open position, as seen, for example, in Figs. 4 and 8.

Figure 4:
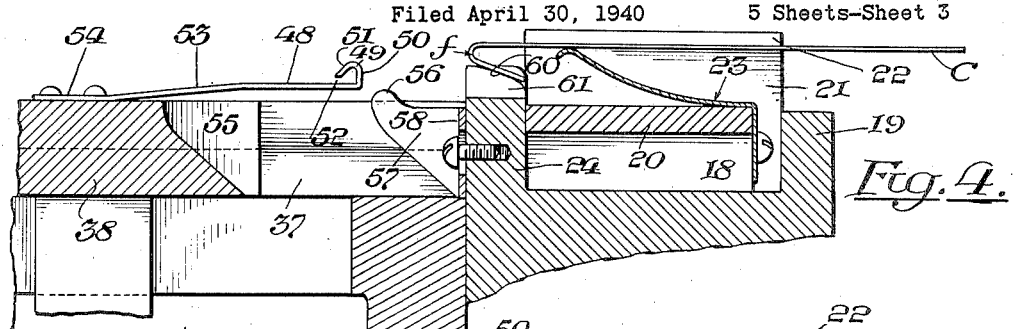
Fig. 4 is a transverse section through the table, the carrier therein, the reciprocating head and a cover-extracting member, the head being shown at the limit of its rearward stroke.

The wall 24 has formed therein suitably located spaces or recesses 61 for the free passage therethrough of the hooks 49 of the blades in a path beneath and against the opposing end folds of the covers during the reciprocation of the head 38. These hooks when the head 38 is in retracted position are rearwardly of and adjacent the relatively fixed cam members 56, as seen in Fig. 4.

Figure 5:
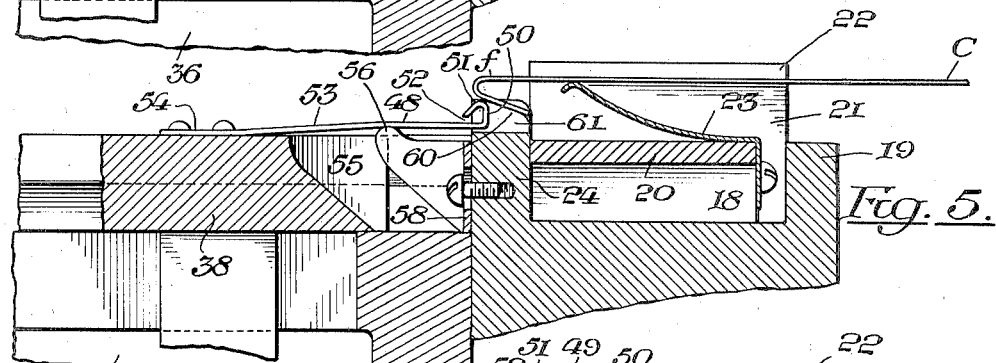
Figs. 5, 6 and 7 are similar sections, showing the head and its cover-extracting member in succeeding positions in relation to the carrier.

In the initial forward stroke of the head 38, the carrier being at rest, the horizontal forward portions of the blades pass idly over the cams until the hooks enter the mouths of the recesses 61 at the folds of the covers, as seen in Fig. 5. Thereupon, as the head continues its stroke, the inclined bearing portions 53 of the blades ride upon the cams 56, and, together with the hook portions of the blades, are thereby slightly raised. Coincidentally the hooks press against the opposing under surfaces of the cover folds, thence escape the free longitudinal edges of the folds.

Figure 1:
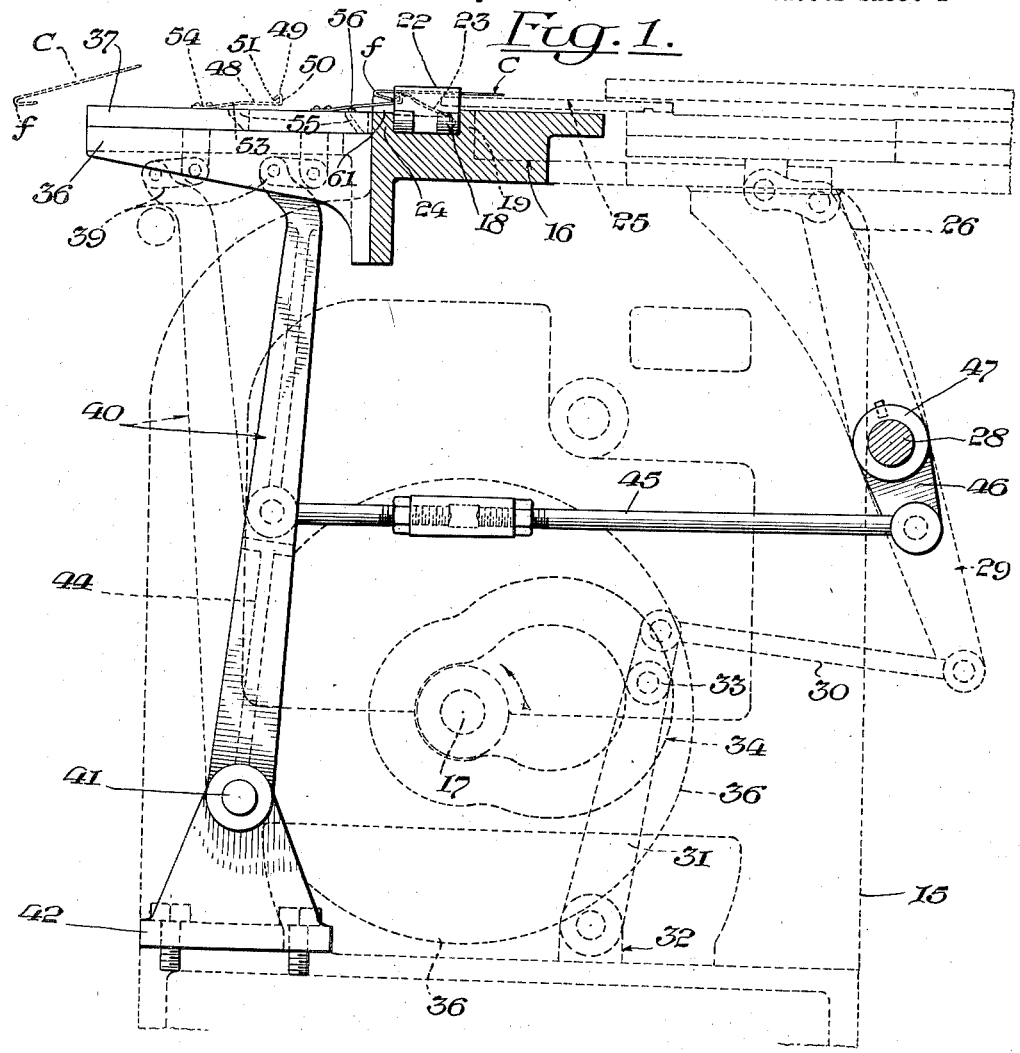
Figure 1 is a transverse vertical section through the table of a booking machine equipped with cover-extracting mechanism embodying the principle of my invention, related parts of the booking machine being indicated in dotted lines.
Figure 2:
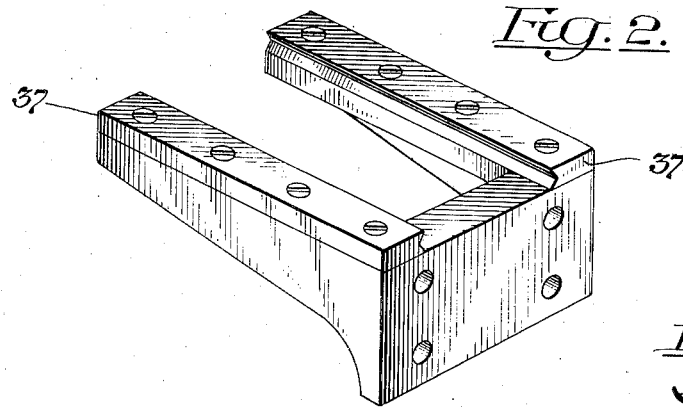
Fig. 2 is a perspective view of a guide structure for a reciprocative head which is included in the cover-extracting mechanism.
Figure 3:
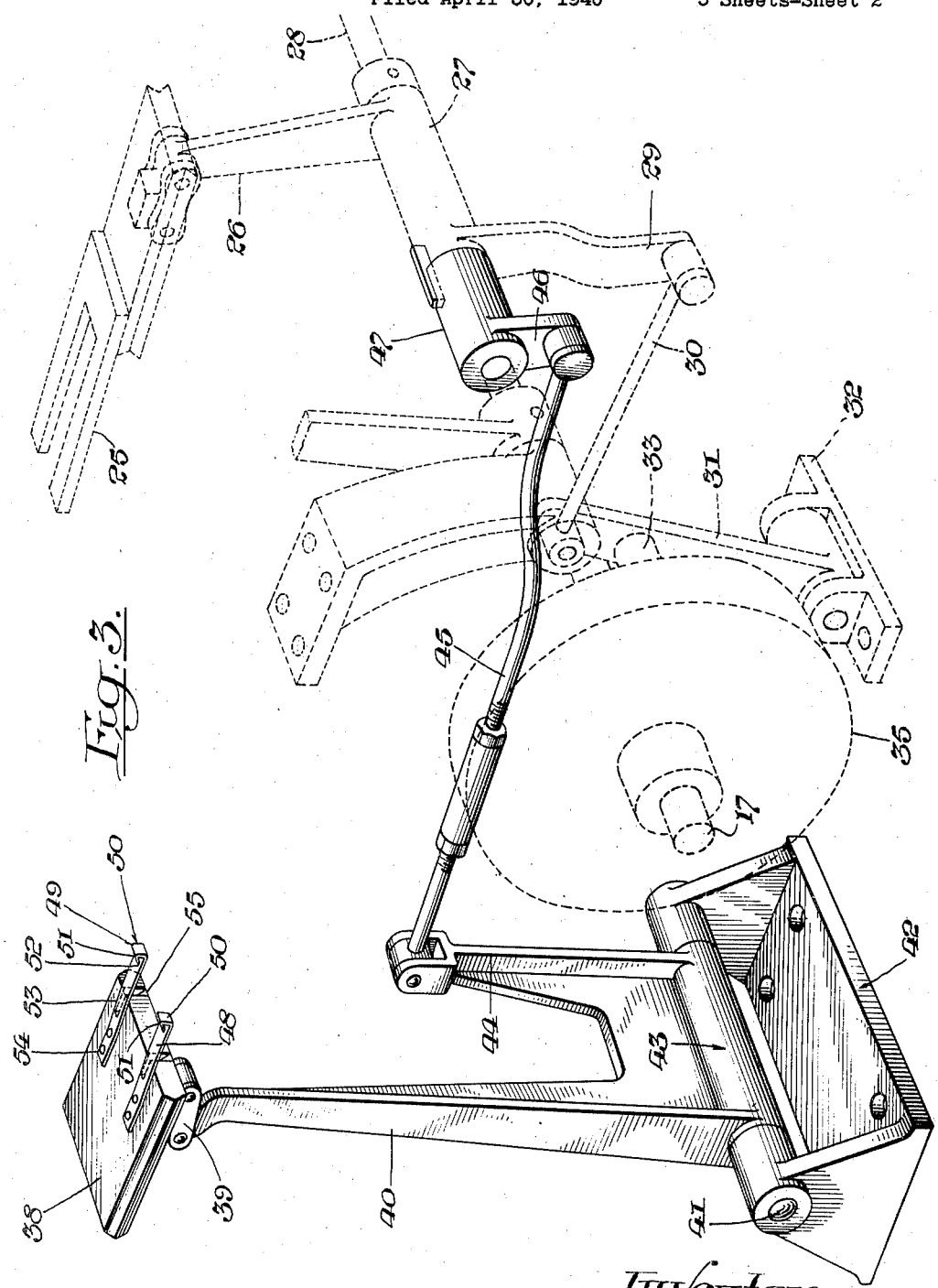
Fig. 3 is a similar view of said head and the actuating devices therefor.
Figure 7:
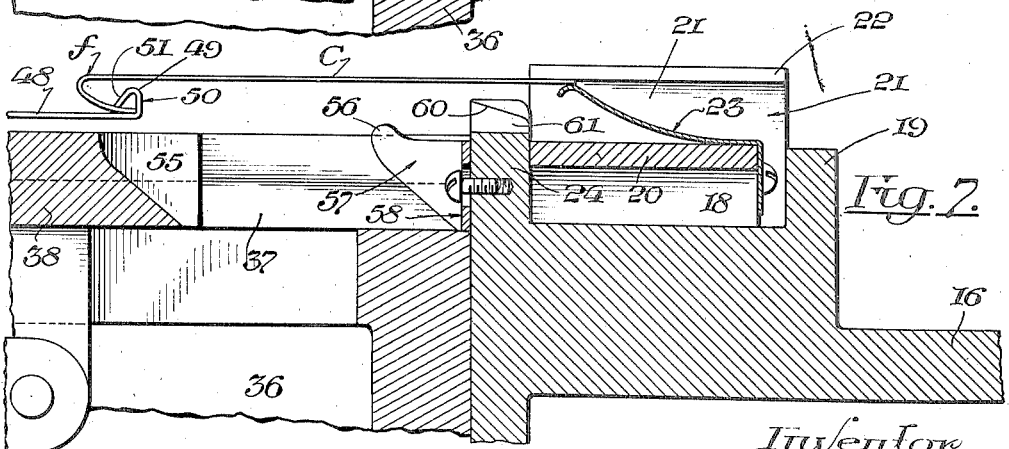

In the absence of match cards from either of the covers, the hook in contact with the opposing fold of the empty cover yieldingly bears against and raises the fold against the body of the cover until the hook escapes the free edge of the fold and moves in contact with the under surface of the body of the cover. Thereupon the free edge of the fold snaps sharply down upon the top of the blade directly in front of the entrant space to the opposing hook, as seen in Fig. 6. In the initial movement of the head 38 in its next succeeding back stroke, the hook, receiving the opposing edge of the cover fold, pulls the cover bodily from the link against the pressure of the leaf spring 23. The cover being under tension the lower edge of the end fold $f$ thereof is securely held by its spaced contact with the overhanging edge of the cam surface 51 and the lower corner bend of the hook, which fold by virtue of its elasticity assumes a downwardly bowed condition, as seen in Fig. 7. The instant the forward edge of the cover escapes the restraining effect of the leaf spring, the end fold $f$ resumes its normal position, the reflex action thus projecting the cover bodily from the hook and rearwardly of the head as indicated by dotted lines at the left of Fig. 1.

When a cover with its complementary match cards is advanced by the carrier to the path of one of the resiliently supported hooks, the hook enters the recess 61 beneath the inclined end fold of the cover, and by virtue of the action of the opposing stationary cam 56 against the inclined portion 53 of the blade the end fold is pressed upwardly, but owing to the backing afforded by the match cards M the hook is slightly depressed against the spring action of the blade. When the hook escapes the free edge of the fold the fold resumes its down position upon the inclined surface of the wall 24 of the trough, but the hook is held depressed by its contact with the opposing match cards. When the hook is thus depressed the entrant space 52 thereof is below the free edge of the cover fold, as seen in Fig. 9. Hence in the next succeeding back stroke of the head, the hook glides idly under and escapes the cover fold, while the cover and its contents remain in the link, see Fig. 10. In its initial rearward movement the spring blade upon the escape of its hook from the cover fold encasing the match cards, resumes its raised or normal position.

In Figs. 12 to 16 of the drawings is illustrated a modified form of the resilient cover extracting device. In this form the stationary cam for periodically raising and permitting the descent of the resilient blade and its hook is omitted, but the blade is "spring set" from a point adjacent the head so as to incline upwardly to a horizontal plane slightly above the floor of the pocket of the adjacent carrier link. Fixed to the upper surface of the blade, at its free end, is a block 490 having an undercut portion which, in conjunction with the underlying surface of the blade, affords a hook having a narrow entrant space 520 at the rear of the block. The top of the block is oppositely bevelled to provide diverging rear and front cam portions, 510 and 511, respectively, the front portion terminating at the base of the block and the rear portion terminating at the entrant space.

As seen in Fig. 12, the inclined front or nose surface of the hook block, as the blade approaches the limit of its forward stroke, impinges against the opposing lower surface of the closed end of the fold, thus camming the fold upwardly until the apex of the block escapes the free edge of the fold, whereupon, in the continued movement of the block the edge of the resilient fold bears against the rearward surface 510 of the block until the fold resumes its down position upon the inclined surface 60 of the trough wall 24. The hook block then being at the end of its forward stroke, has escaped the edge of the fold. If the cover is supplied with match cards the block will be forced down slightly against the spring pressure of the blade, and when the block escapes the cover the block will be held in down position by the contact of its apex with the opposing match cards, the entrant space to the hook thus being lower than the free edge of the fold, as seen in Fig. 13. Hence in the initial back movement of the block it will pass freely under the fold while the cover and its contents will remain in the carrier, as seen in Fig. 14. If, however, the match cards should have been omitted from the cover, the inclined nose of the hook block, as the blade approaches the limit of its forward stroke, will impinge against and cam the opposing fold upward against the body of the cover, and when the apex of the block escapes the fold the fold will snap downward upon the upper surface of the blade, thus being supported in line with the entrant recess 520 of the hook, as seen in Fig. 15. Hence in the initial back movement of the blade the hook will receive the edge of the cover fold, thus pulling the cover bodily from the carrier against the surface pressure of the leaf spring and discharging the empty cover in the same manner as previously described.

It is to be understood that my invention is not limited to the particular exemplifying forms of embodiment thereof herein disclosed, as the mechanisms may be modified within the principle of the invention and the scope of the appended claims.

I claim:

1. In combination with a travelling carrier constructed to receive and transport a succession of assembled covers and cards, said covers having resilient end folds adapted to enclose the adjacent ends of the complementary cards, means including a hook for extracting from the carrier inserted covers from which the cards have been omitted, said hook having an entrant space for the reception of the free edges of the end folds of empty covers presented thereto, and means for moving said hook toward and from one side of the carrier in a path extending transversely of and beyond the path of the folds of the covers borne by the carrier, said entrant space when the hook reaches the limit of its forward movement being coincident with the plane of the free edge of the proximate end fold of an empty cover, but being deflected by the end fold and contents of a filled cover to non-coincidental relation with the plane of the free edge of the latter fold.

2. In combination with a travelling carrier constructed to receive and transport a succession of assembled covers and cards, said covers having resilient end folds adapted to enclose the adjacent ends of the complementary cards, means for extracting from the carrier inserted covers from which the cards have been omitted, said means including a resiliently supported hook movable toward and from the carrier and having an entrant space arranged and adapted to receive the free edge of the fold of each empty cover advanced by the carrier to the path of the hook, said path extending transversely of and in close relation to the path of the cover folds, and means for actuating said hook in timed relation to the carrier, whereby in the absence of a card or cards from a cover borne by the carrier the entrant space of the hook is positioned to receive the free edge of the fold of the empty cover during the retracting movement of the hook, and whereby in the presence of a card or cards in the proximate cover said space is positioned to escape the cover fold during such retracting movement.

3. In combination with a travelling carrier embodying a succession of pocketed holders each having resilient clamping means for an assembled cover and card, said cover having a resilient end fold adapted to enclose the adjacent end of the complementary card, means for extracting from the carrier inserted covers from which the cards have been omitted, said means including a resiliently supported hook movable toward and from the carrier and having an entrant space arranged and adapted to receive the free edge of the fold of each empty cover advanced by the carrier to the path of the hook, said path extending transversely of and in close relation to the path of the cover folds, and means for actuating said hook in timed relation to the carrier, whereby in the absence of a card or cards from a cover borne by the carrier the entrant space of the hook is positioned to receive the free edge of the fold of the empty cover and effect the withdrawal of the cover under tension from the carrier during the retracting movement of the hook, and whereby in the presence of a card or cards in the proximate cover said space is positioned to escape the cover fold during such retracting movement.

4. In combination with a travelling carrier to receive and transport a succession of assembled covers and cards, said covers having resilient end folds which enclose the adjacent ends of the respective cards, a resilient blade having a hook at its forward end, means for actuating said blade to move its hook toward the carrier and back again in timed relation to the carrier, the forward movement of the hook being in a path extending transversely of and in close relation to the path of the end folds of the covers, and beyond the free inner edges of the folds, said hook as it approaches the limit of its forward stroke having capacity for movement toward the surface of the body of the adjacent cover, whereby in the absence from the cover of a card or cards to oppose the resilient movement of the hook when it escapes the fold, the entrant space of said hook is in position to receive the opposing edge of said fold during the initial back movement of the hook member.

5. In combination with a travelling carrier to receive and transport a succession of assembled covers and cards, said covers having resilient end folds which enclose the adjacent ends of the respective cards, a resilient member having a hook at its forward end and also having a bearing portion spaced from the hook, and means for actuating said member to move its hook toward the carrier and back again in timed relation to the carrier, the forward movement of the hook being in a path extending transversely of the end folds of the covers and beyond the free inner edges of the folds, and a stationary member upon which said bearing portion rides as the hook approaches the limit of its forward stroke, thus moving the hook toward the adjacent surface of the body of the cover, whereby in the absence from the cover of a card or cards to oppose the hook when it escapes the fold, the entrant space to said hook is in position to receive the free edge of said fold during the initial back movement of the hook member.

6. In combination with a travelling carrier to receive and transport a succession of assembled covers and cards, said covers having resilient end folds which project beyond one side of the carrier and enclose the adjacent ends of the respective cards, a support for limiting the opening movement of the projecting end folds, said support arranged adjacent such side of the carrier and having a transverse space communicating with the path of the cover fold, a resilient hook member, means for actuating said member to move the hook toward the carrier and back again in timed relation to the carrier, the forward movement of the hook being in a path extending through said transverse space and beyond the free edge of the proximate fold, whereby in the absence from the cover of a card or cards to oppose the resilient action of the hook when it passes beyond the fold, the entrant space to said hook is in position to receive the free edge of said fold during the initial back movement of the hook member.

7. In means for removing from the travelling carrier of a match booking machine end-folded covers from which card matches have been omitted, a resilient cover extracting member movable to and from the side of the carrier where the end folds are located, said member having at its forward end a hook projection movable in close relation to and beyond the cover fold, said hook projection having a rearwardly inclined portion terminating short of the body of the extracting member, thus providing a camming surface and an entrant space for the free edge of an empty cover fold during the extracting movement of said member.

8. In means for removing from the travelling carrier of a match booking machine end-folded covers from which card matches have been omitted, a cover extracting member movable to and from the side of the carrier where the end folds are located, said member composed of a resilient blade having at its free forward end a hook projection comprising a bent angular nose portion extending from the body of the blade and merging with a portion extending rearwardly and downwardly toward but short of the body of the blade, thus providing a rear camming surface and an entrant space for the free edge of an empty cover fold during the extracting stroke of said member.

9. In means for removing from the travelling carrier of a match booking machine end-folded covers from which card matches have been omitted, a resilient cover extracting member movable to and from the side of the carrier where the end folds of the covers are located, said member having at its forward end a hook projection shaped to provide an acute angular nose portion merging with a rearwardly inclined portion terminating short of the body of the extracting member, thus providing camming surfaces for the fold of an empty cover during the forward and back motions, respectively, of the said member, and also providing an entrant space for the free edge of said fold during the initial back motion of said member.

JOHN R. NOLAN.